United States Patent
Morin et al.

(10) Patent No.: US 7,343,998 B2
(45) Date of Patent: Mar. 18, 2008

(54) ALL-TERRAIN VEHICLE WITH SUBTRANSMISSION DETACHABLY MOUNTED TO THE ENGINE

(75) Inventors: Vincent Morin, Magog (CA); Ghislain Caron, Valcourt (CA); Ronald Schapf, Ottawa (CA); Roland Ennsmann, Wels (AT)

(73) Assignees: Bombardier Recreational Products Inc., Valcourt (CA); BRP-Rotax GmbH & Co. KG (AT)

( * ) Notice: Subject to any disclaimer, the term of this patent is extended or adjusted under 35 U.S.C. 154(b) by 0 days.

(21) Appl. No.: 11/182,838

(22) Filed: Jul. 18, 2005

(65) Prior Publication Data

US 2006/0019790 A1    Jan. 26, 2006

Related U.S. Application Data

(60) Provisional application No. 60/588,329, filed on Jul. 16, 2004, provisional application No. 60/668,101, filed on Apr. 5, 2005.

(51) Int. Cl.
*B60K 17/34* (2006.01)
*B60K 17/348* (2006.01)

(52) U.S. Cl. ........... 180/233; 180/247; 180/248; 180/291; 180/292; 180/908

(58) Field of Classification Search ........ 180/908, 180/247, 248, 291, 292
See application file for complete search history.

(56) References Cited

U.S. PATENT DOCUMENTS

| | | | |
|---|---|---|---|
| 5,205,373 A | 4/1993 | Kadokura et al. | |
| 5,704,443 A | 1/1998 | Janiszewski | |
| 5,941,789 A * | 8/1999 | McCarrick et al. | 475/214 |
| 6,112,826 A * | 9/2000 | Ura et al. | 172/255 |
| 6,182,784 B1 | 2/2001 | Pestotnik | |
| 6,499,443 B2 * | 12/2002 | Kawamoto et al. | 123/41.44 |
| 6,625,966 B2 * | 9/2003 | Kaneyuki et al. | 56/14.7 |
| 6,637,539 B2 * | 10/2003 | Rioux et al. | 180/339 |
| 6,694,836 B2 * | 2/2004 | Kawamoto et al. | 74/371 |
| 6,725,962 B1 * | 4/2004 | Fukuda | 180/292 |
| 6,755,269 B1 * | 6/2004 | Davis et al. | 180/89.1 |

(Continued)

FOREIGN PATENT DOCUMENTS

CA    2452511    12/2003

(Continued)

*Primary Examiner*—Lesley D. Morris
*Assistant Examiner*—Marlon Arce-Diaz
(74) *Attorney, Agent, or Firm*—Osler, Hoskin & Harcourt LLP (57) ABSTRACT

An all-terrain vehicle (ATV) has a subtransmission detachably fastened to an engine casing. The engine crankshaft includes a drive pulley connected via a belt to a driven pulley in the subtransmission, thus providing a continuously variable transmission (CVT) between the engine crankshaft and the subtransmission. The subtransmission includes a 2WD-4WD selector mechanism to select two-wheel-drive or four-wheel-drive and also includes a transmission selector mechanism to put the vehicle in park, neutral, reverse, high-speed drive or low-speed drive. By disposing these selector mechanisms in the subtransmission, mass centralization is improved relative to prior-art drivetrains wherein the 2WD-4WD selector mechanism connects to the front differential. When operating in 2WD mode, the drivetrain does not waste energy rotating the front drive shaft, as in the prior art.

22 Claims, 6 Drawing Sheets

U.S. PATENT DOCUMENTS

| | | | |
|---|---|---|---|
| 6,823,960 B2 * | 11/2004 | Shimizu et al. | 180/292 |
| 6,863,146 B2 * | 3/2005 | Kawamoto et al. | 180/346 |
| 6,978,857 B2 * | 12/2005 | Korenjak | 180/292 |
| 2002/0074178 A1 | 6/2002 | Izumi | |
| 2005/0126842 A1 | 6/2005 | Rasidescu | |

FOREIGN PATENT DOCUMENTS

| | | |
|---|---|---|
| GB | 885580 A | 12/1968 |
| JP | 58136520 A | 8/1983 |
| JP | 2002 174323 A | 6/2002 |
| JP | 2002 264 685 A | 9/2002 |

* cited by examiner

FIG. 5 ized mass without unduly compromising ground clearance and ergonomics. Mass centralization can be improved by locating heavy components as close as possible to the geometrical center of the vehicle.

ALL-TERRAIN VEHICLE WITH SUBTRANSMISSION DETACHABLY MOUNTED TO THE ENGINE

CROSS-REFERENCE TO RELATED APPLICATIONS

This U.S. nonprovisional application claims priority to U.S. provisional application Ser. No. 60/588,329 filed Jul. 16, 2004, titled ANTRIEBSEINHEIT EINES KLEINFAHRZEUGES. This U.S. nonprovisional application also claims priority on U.S. provisional application Ser. No. 60/668,101 filed Apr. 5, 2005, titled ALL-TERRAIN VEHICLE WITH SUBTRANSMISSION DETACHABLY MOUNTED TO ENGINE CASING. Both provisional applications are included herein by reference.

FIELD OF THE INVENTION

The present invention relates generally to an all-terrain vehicle (ATV) and, more particularly, to a drivetrain of an ATV.

BACKGROUND OF THE INVENTION

All-terrain vehicles (ATVs) are designed to traverse rugged terrain. Accordingly, vehicle stability is one of the primary design considerations. As is well known in the art, vehicle stability can be improved by lowering and centralizing mass without unduly compromising ground clearance and ergonomics. Mass centralization can be improved by locating heavy components as close as possible to the geometrical center of the vehicle.

In the prior art, some ATV manufacturers (e.g. Yamaha and Kawasaki) have developed drivetrains in which the subtransmission is separated from the engine. These have benefits in terms of assembly and maintenance. For example, U.S. Pat. No. 6,286,619 (Uchiyama et al.) discloses an ATV transmission in which a final drive assembly is mounted to a rear of the frame and is operatively connected to the engine via a belt or chain. This drivetrain design expedites assembly by obviating the need to install a fully assembled drivetrain (engine and subtransmission). Likewise, in U.S. Pat. No. 6,601,668 (Kitai et al.), a rear reduction gear case is mounted at the rear of the ATV and receives power from the engine via a rear propeller shaft.

However, these prior-art drivetrains are suboptimal in terms of mass centralization as the substantial weight of each subtransmission is located toward the rear of the vehicle.

Furthermore, as is known in the art, engine-generated reaction forces are borne by the frame at the engine-mounting points. As the subtransmission is mounted at a distance from the engine, all engine reaction loads are concentrated at the few connection points where the engine casing is joined to the frame.

In light of the foregoing, there remains a need for an ATV drivetrain that improves vehicle dynamics by redressing at least one of the aforementioned deficiencies of the prior art.

SUMMARY OF THE INVENTION

It is therefore an object of the present invention to provide an ATV having a drivetrain in which a subtransmission is detachably connected to an engine casing.

In accordance with an aspect of the present invention, an all-terrain vehicle includes a frame; a straddle seat mounted on the frame for supporting a driver; only four wheels suspended from the frame, the four wheels including a front pair of wheels mounted to a front wheel axle and a rear pair of wheels mounted to a rear wheel axle, each wheel being disposed with a low-pressure balloon tire; a handlebar disposed on the frame, the handlebar being operatively connected to at least one of the wheels for steering the vehicle; an engine contained within an engine casing mounted to the frame, the engine powering a crankshaft in driving engagement with a subtransmission, the subtransmission including a gearbox for driving a rear drive shaft operatively connected to a rear differential for delivering torque to the rear wheels, wherein the subtransmission is detachably connected to the engine casing. The differential can be an automotive type differential, a visco-lock type differential or a simple gearbox taking the input from the engine and transmitting it to the rear wheels without permitting any speed differentiation between both wheels.

In accordance with another aspect of the present invention, an all-terrain vehicle includes a frame; a straddle seat mounted on the frame for supporting a driver; a rear suspension system for supporting rear wheels disposed with low-pressure balloon tires; a front suspension system for supporting front wheels disposed with low-pressure balloon tires; and an engine contained within an engine casing mounted to the frame, the engine powering a crankshaft in driving engagement with a subtransmission, the subtransmission including a gearbox for driving a rear drive shaft operatively connected to a rear differential for delivering torque to the rear wheels, wherein the subtransmission is detachably connected to the engine casing.

In one embodiment, the ATV further includes a front-to-rear drive shaft coupling for rotationally coupling the rear drive shaft to a front drive shaft whereby torque is delivered to both the rear differential and a front differential for providing power to both the rear wheels and front wheels.

In another embodiment, the crankshaft has a drive pulley connected by a belt to a driven pulley in the subtransmission, thus providing a continuously variable transmission (CVT) between the engine crankshaft and the subtransmission.

In yet another embodiment, the subtransmission includes a 2WD-4WD selector mechanism to selectively engage or disengage the front-to-rear drive shaft coupling to switch between two-wheel-drive and four-wheel-drive.

In a further embodiment, the subtransmission further includes a transmission selector mechanism to enable a driver to select one of a plurality of drive modes for the vehicle, the drive modes including park, neutral, reverse and drive. A Hi and Low transmission range is also provided in the subtransmission.

By detachably connecting the subtransmission to the engine, mass centralization is improved. Since the subtransmission is detachable, assembly and maintenance are also facilitated. Furthermore, by disposing the 2WD-4WD selector mechanism and the transmission selector mechanism in the subtransmission, mass centralization is improved relative to prior-art drivetrains wherein the 2WD-4WD selector mechanism is operatively connected to the front differential.

As a further benefit, the drivetrain of the present invention does not waste energy rotating the front drive shaft when operating in 2WD mode, as does the prior art.

The subtransmission also contributes structurally to the vehicle, absorbing a portion of the engine reaction loads. In other words, the engine reaction loads are partly transferred to the subtransmission and the subtransmission-frame connection points so that the engine reaction loads are spread over a greater portion of the frame, thus diminishing the deleterious effects of engine reaction force on the vehicle.

In addition, an ATV having the subtransmission detachably connected to the engine provides a lighter drivetrain than comparable prior-art drivetrains.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
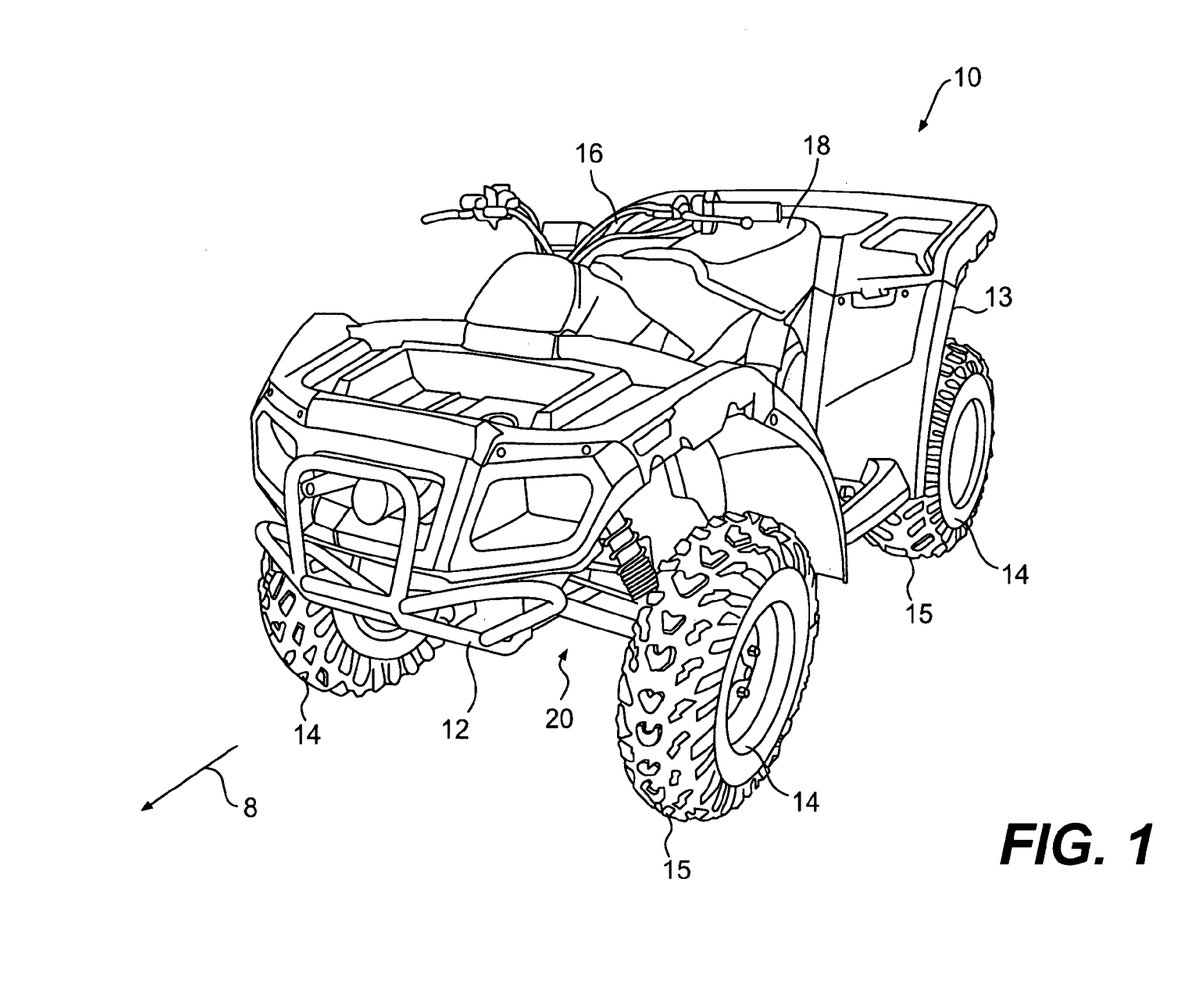
FIG. 1 is an isometric perspective view of an ATV incorporating an embodiment of the present invention.

FIG. 1 is an isometric perspective view of an all-terrain vehicle (ATV), generally designated by reference numeral 10, incorporating a drive train 20 in accordance with an embodiment of the present invention. The ATV 10 includes a frame 12 to which is mounted a body 13 and an internal combustion engine (not visible in FIG. 1) for powering the vehicle. Also connected to the frame are four wheels 14 with low-pressure balloon tires 15 which are adapted for off-road conditions and traversing rugged terrain. The ATV 10 further includes a straddle seat 18 mounted to the frame 12 for supporting a driver and optionally one or more passengers. The ATV 10 has a center of gravity through which traverses a central longitudinal axis 8 that is coincident with a travel direction of the vehicle.

As shown in FIG. 1, two front wheels 14 are suspended from the frame 12 by respective front suspension assemblies (e.g. double A-arm suspension systems) while two rear wheels 14 are suspended from the frame by respective rear suspension assemblies (e.g., rigid swing arm suspension systems). The front and rear wheels 14 have 10 to 12 inch rims and are each disposed with a low-pressure balloon tire 15 that is mounted to a rim of each wheel and inflated to a pressure of no more than 2 kg/cm$^2$ (i.e., no more than 196 kPa or 28 psi).

Still referring to FIG. 1, the ATV further includes a steering mechanism 16 which is rotationally supported by the frame to enable a driver to steer the vehicle. The steering mechanism 16 includes handlebars connected to a steering column (not shown) for actuating steering linkages connected to left and right front drive assemblies.

As is known in the art, the ATV 10 is powered by an internal combustion engine 30, e.g. a 4-cycle single overhead cam engine whose cylinders are configured in a single or double V although, as will be readily appreciated by those of ordinary skill in the art, other types and configurations of engines can be substituted. The cylinders house reciprocating pistons connected to a crankshaft, as is also well known in the art. The crankshaft of the engine 30 is coupled to a drivetrain 20 which delivers torque to the rear wheels, providing at least two-wheel-drive (2WD), and optionally also delivers torque to the front wheels for four-wheel-drive (4WD) traction.

Figure 2:
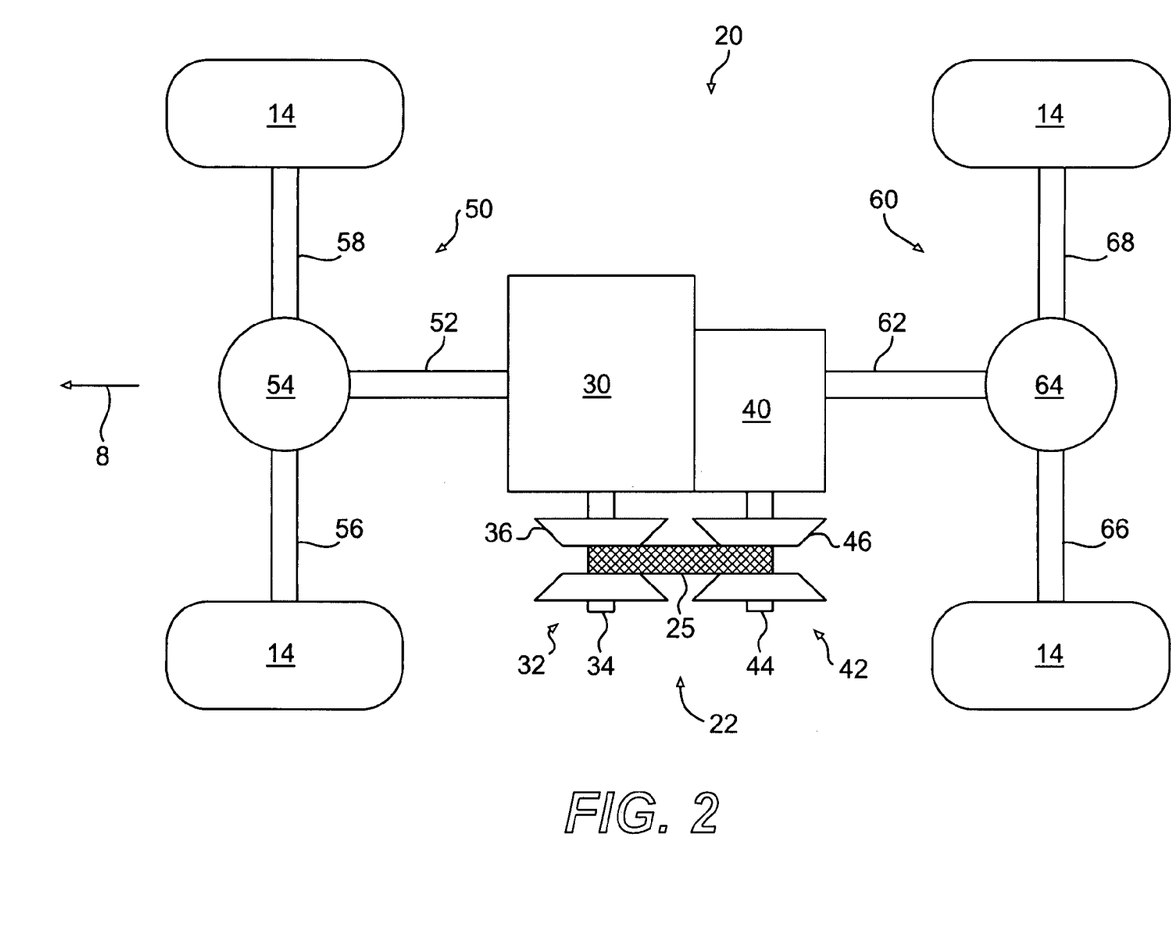
FIG. 2 is a schematic layout of an ATV drivetrain in accordance with a preferred embodiment of the present invention.

FIG. 2 illustrates in schematic form the power path of the drivetrain 20 in accordance with a preferred embodiment of the present invention. As mentioned above, the drivetrain 20 is mechanically coupled to the internal combustion engine 30. The drivetrain 20 includes a subtransmission 40 that is detachably connected to the engine 30 to form an engine-subtransmission unit. The subtransmission 40 is preferably connected to the engine with threaded fasteners, e.g. bolts, which facilitate assembly and disassembly of the engine-subtransmission unit.

As shown in FIG. 2, the engine 30 and subtransmission 40 are operatively connected by a CVT (continuously variable transmission) 22 having a belt 25 connecting an engine output mechanism 32 to a subtransmission input mechanism 42. The engine output mechanism 32 includes a crankshaft 34 connected to and driven by the pistons in the cylinders of the internal combustion engine 30. Mounted to the crankshaft 34 is a drive pulley 36 which drives a corresponding driven pulley 46 via the belt 25. The driven pulley 46 is mounted to an input shaft 44 which delivers power to the subtransmission 40. The input shaft 44 rotates about a transmission shaft axis. The subtransmission 40 has a gearbox (not shown, but well known in the art) to reduce the angular velocity of the input shaft in favor of greater torque.

As shown in FIG. 2, the subtransmission 40 operatively connects to both a front drive system 50 and a rear drive system 60. The front drive system 50 includes a front drive shaft 52 connected at a rearward end to the subtransmission 40 and at a forward end to a front differential 54. The front differential 54 is connected to a left front axle 56 and a right front axle 58 which are, in turn, connected to the front wheels 14. Likewise, the rear drive system 60 includes a rear drive shaft 62 connected a forward end to the subtransmission 40 and at a rearward end to a rear differential 64. The rear differential 64 connects to a left rear axle 66 and a right rear axle 68 which are, in turn, connected to the rear wheels 14.

Figure 3:
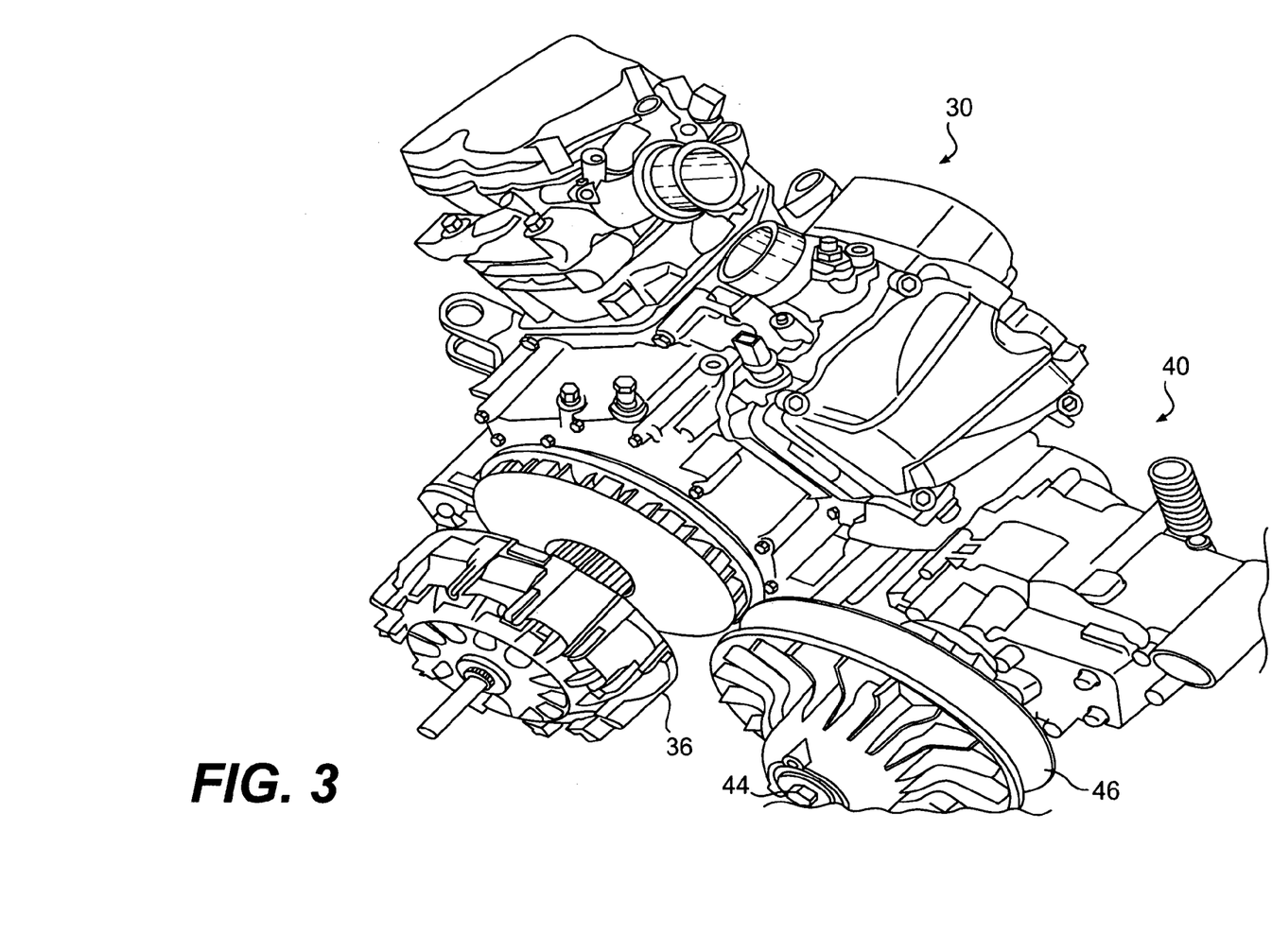
FIG. 3 is a perspective view of the engine and subtransmission in accordance with the preferred embodiment of the present invention.
Figure 4:
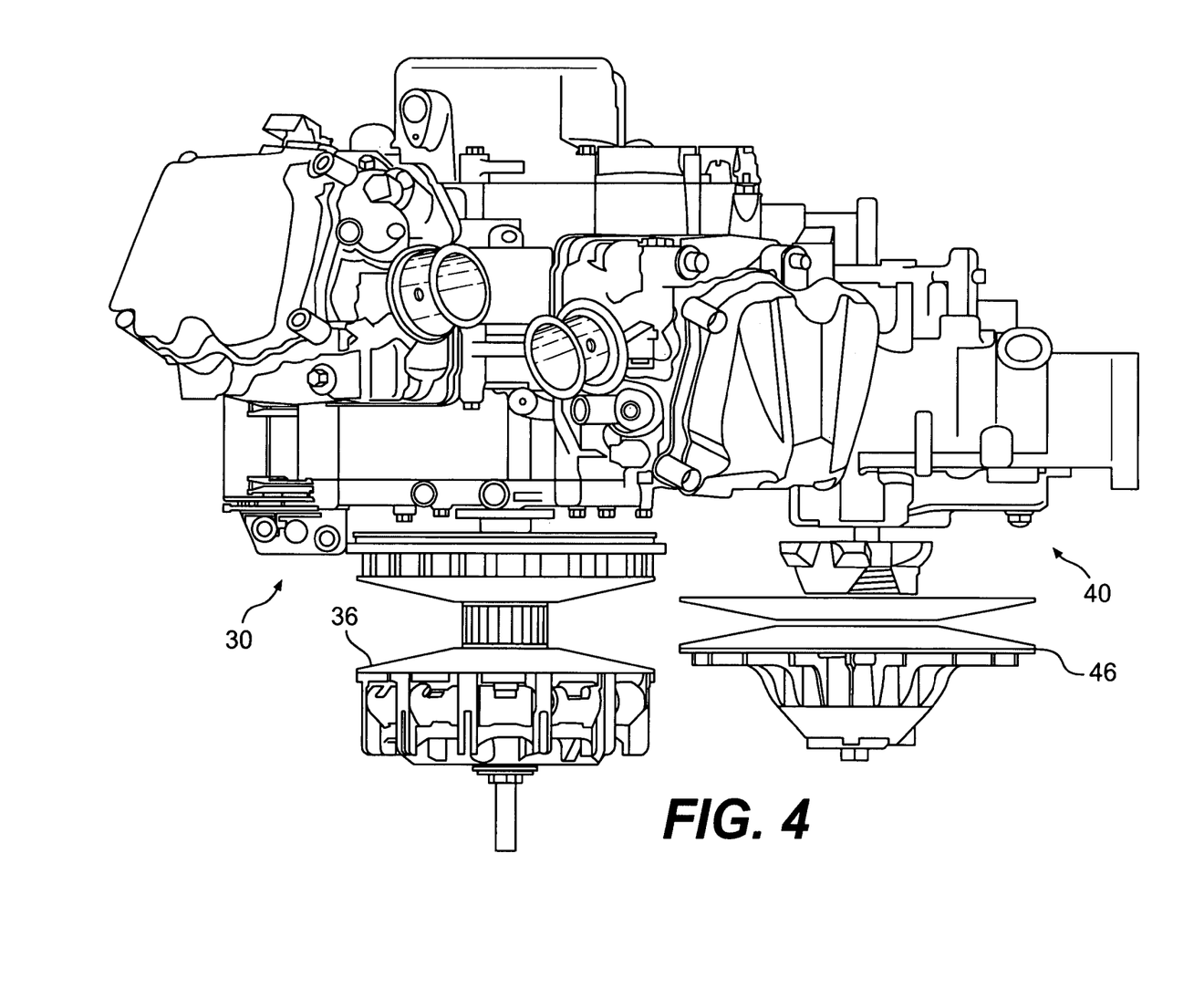
FIG. 4 is a top view of the engine and subtransmission in accordance with the preferred embodiment of the present invention.
Figure 5:
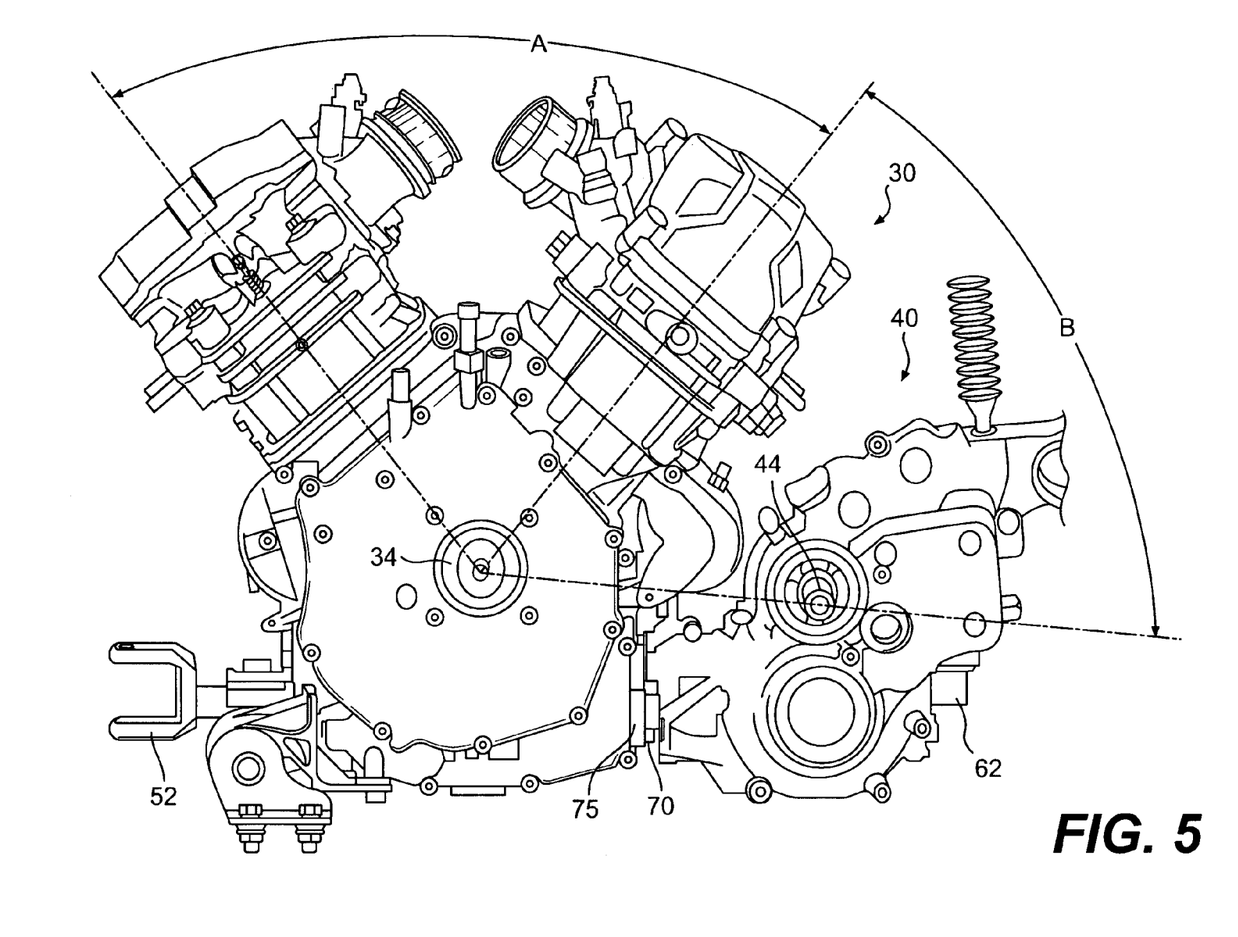
FIG. 5 is a side view of the engine and subtransmission, shown without the drive and driven pulleys, in accordance with the preferred embodiment of the present invention.

FIGS. 3-5 present various views of the engine 30 and detachably connected subtransmission 40 in accordance with the preferred embodiment of the present invention. As described above, the engine 30 and subtransmission 40 are drivingly coupled via the continuously variable transmission (CVT).

Specifically, as shown in FIG. 3, the drive pulley 36 (connected to the crankshaft of the engine 30) drives the driven pulley 46 which is connected to the input shaft 44 of the subtransmission 40.

FIG. 4 is a top view of the engine 30 and detachably connected subtransmission 40. The drive pulley 36 and the driven pulley 46 permit a continuously variable transmission ratio by virtue of the opening or closing of opposed conical side faces of one or more of the pulleys, as is known in the art.

FIG. 5 is a side view of the engine 30 and detachably connected subtransmission 40, shown for greater clarity without the drive pulley and driven pulley. FIG. 5 shows the crankshaft 34 of the engine 30 as well as the input shaft 44 of the subtransmission 40, which connect to the drive and driven pulleys, respectively. Also illustrated in FIG. 5 are the front drive shaft 52 and the rear drive shaft 62 which can deliver torque to the front and rear wheels, respectively.

In the preferred embodiment, as shown in FIG. 5, the subtransmission 40 is fastened to the rear lower portion of the engine casing of the internal combustion engine 30 using a plurality of threaded fasteners 70, e.g. bolts or screws. The use of threaded fasteners 70 facilitates assembly and disassembly, i.e. expedites the attaching and detaching of the subtransmission to and from the engine casing. As illustrated in FIG. 5, in the preferred embodiment, the subtransmission 40 has a forward-facing mounting flange 75 for engaging a rear surface of the engine casing 30. The mounting flange 75 includes a plurality of circumferentially spaced holes through which the threaded fasteners 70 are inserted. In the preferred embodiment, the engine casing 30 has a plurality of circumferentially spaced bores corresponding to the holes in the mounting flange 75. The bores in the engine casing 30 are drilled and tapped with threads corresponding to the threads of the fasteners 70. It should be noted that a further design consideration is to provide sufficient clearance between the engine casing and the subtransmission to access all of the fasteners with a wrench or other such tool. Optionally, washers may be provided to minimize localized stress where the fasteners are tightened to a very high torque, as is known in the art. Also, as known in the art, a thread-locker such as Loctite may applied to further secure the threaded connections so as to prevent loosening of the threaded connections due to engine vibration.

Still on FIG. 5, the angle "A" between both cylinders of the V-engine is defined by the angle between each cylinder bore. The angle "A" being ideally between 29° and 121°. Planes can be defined using the crank shaft axis and respectively each cylinder bore. The angle between both plane would be the same as the angle "A". The angle "B" between the cylinder inclined toward the sub-transmission and the sub-transmission is defined by the cylinder's axis and the line between the engine's crank shaft and the input shaft 44 of the subtransmission. The angle "B" being ideally between 85° and 5°. Planes can be defined using the crank shaft axis and the cylinder bore of the cylinder inclined toward the sub-transmission. The angle between both plane would be the same as the angle "B".

In the preferred embodiment, the subtransmission 40 includes a 2WD-4WD selector mechanism to selectively engage or disengage a front-to-rear drive shaft coupling. The enables a driver to switch between two-wheel drive and four-wheel drive. In the preferred embodiment, the subtransmission 40 also includes a transmission selector mechanism to enable a driver to select one of a plurality of drive modes for the vehicle, the drive modes including park, neutral, reverse and drive. In the most preferred embodiment, the drive modes further include high-speed drive and low-speed drive. As will be appreciated by those of ordinary skill in the art, the transmission selector mechanism can enable selection of other drive modes, e.g. three or more forward drive speeds. The transmission selector mechanism is itself connected to a shifter (not shown) that is readily accessible by the driver thereby enabling the driver to actuate the transmission selector mechanism while comfortably seated in the driver seat.

Figure 6:
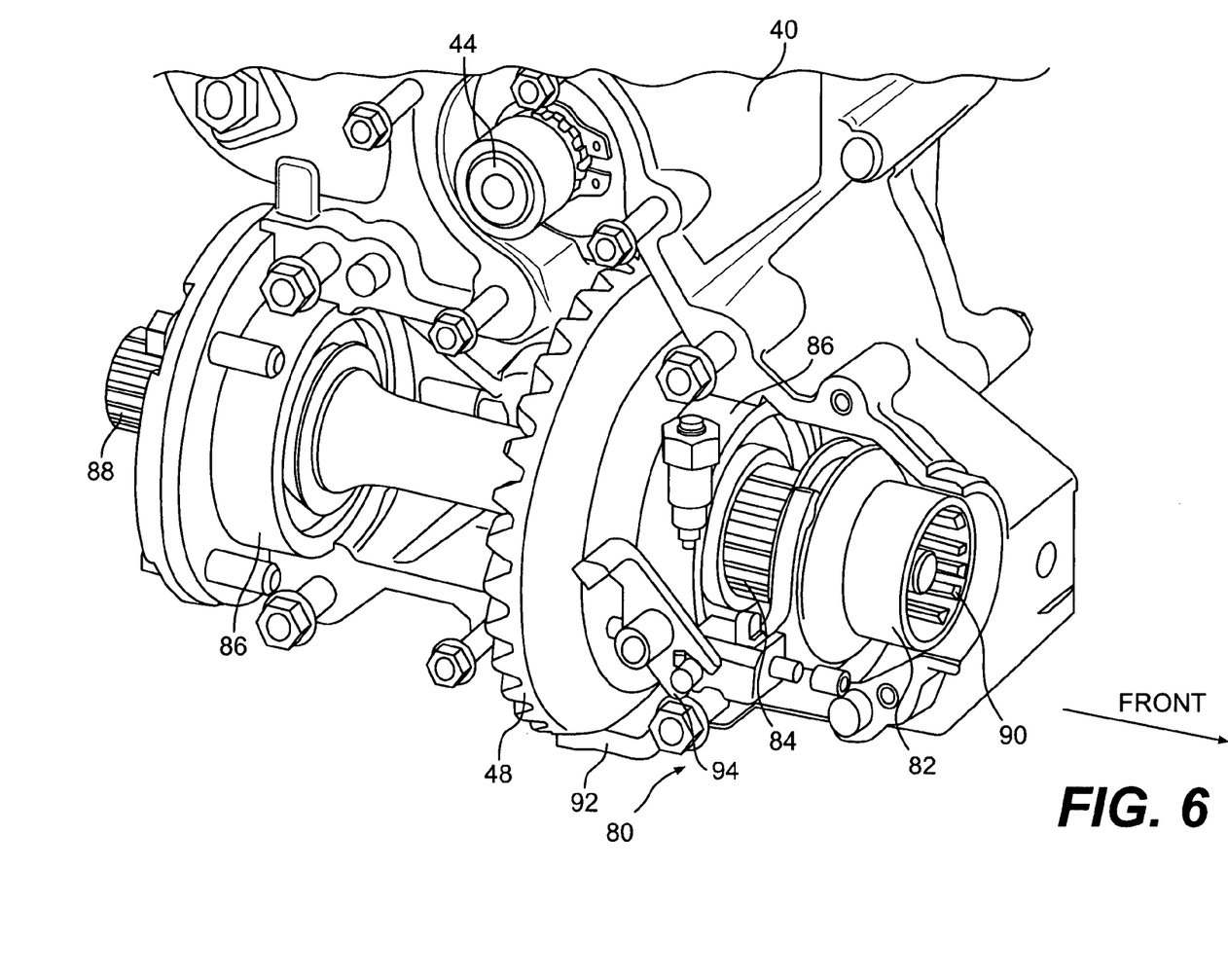
FIG. 6 is an isometric perspective view of a 2WD-4WD selector mechanism.

FIG. 6 is an isometric perspective view of a 2WD-4WD selector mechanism 80 disposed at a bottom portion of the subtransmission 40. As is known in the art, the mechanical power delivered to the subtransmission 40 via the input shaft 44 is transmitted to a reduction gear 48 mounted to a splined shaft 84. The power is transmitted from the traversely rotating input shaft to the axially rotating drive shafts via a gearbox having orthogonal bevel gears. As will be appreciated by those of ordinary skill in the art, the exact gearing of the gearbox in the subtransmission can be tailored to produce a desired range of angular velocities (shaft RPM) for the front and rear drive shafts.

As shown in FIG. 6, the 2WD-4WD selector mechanism 80 includes an axially movable splined sleeve 82 which acts as a front-to-rear drive shaft coupling. The splined sleeve 82 can be selectively slid onto the splined shaft 84 in order to couple the front drive shaft to the rear drive shaft, i.e. to enable the subtransmission to power both the front and rear drive shafts simultaneously. The splined shaft 84 is supported by, and runs on, a pair of bearings that are, in turn, snugly housed in bearing mounts 86. The splined shaft 84 has forward splines for meshing with the splined sleeve 82 as well as rearward splines 88 for meshing with corresponding splines on the rear drive shaft (not shown in this figure).

As further illustrated in FIG. 6, the splined sleeve 82 converges in a forward direction to a narrow front splined neck 90 for meshing with corresponding splines on the front drive shaft (not shown in this figure). In other words, the splined sleeve has two distinct sets of splines, one rearward facing set of splines for selectively meshing with the splined shaft 84 and one forward facing set of splines meshed with the front drive shaft. Accordingly, the coupling of the splined sleeve 82 to the splined shaft 84 causes torque to be delivered from the subtransmission to both the front and rear drive shafts and hence to both the front and rear wheels.

As depicted in FIG. 6, the splined sleeve 82 is actuated by a lever arm 92 that is pivotally mounted about a pivot 94. The lever arm 92 causes axial displacement of the splined sleeve 82 into and out of locking engagement with the splined shaft 84. In operation, the driver merely toggles a 2WD-4WD switch which pivots the lever arm 92 about pivot 94 and thus axially displaces the splined sleeve 82 into engagement with the splined shaft 84, thereby distributing power to the front wheels in addition to the rear wheels so as to provide four-wheel traction. To return to 2WD mode, the driver toggles the switch which pivots the lever arm 92 back to a disengaged position. Consequently, the splined sleeve 82 axially disengages from the splined shaft 84, whereby the front drive shaft ceases to be operatively connected to the subtransmission.

Although the 2WD-4WD selector mechanism 80 is itself known in the art, the drivetrain in accordance with the present invention disposes the 2WD-4WD selector mechanism in the subtransmission 40 instead of on the front differential, as is done in prior-art ATV drivetrains. By disposing the 2WD-4WD selector mechanism 80 in the subtransmission 40, mass centralization for the ATV is improved compared to the prior art.

Persons of ordinary skill in the art will appreciate that variations or modifications may be made to the drivetrain of the all-terrain vehicle disclosed in the specification and drawings without departing from the spirit and scope of the invention. Furthermore, persons of ordinary skill in the art will appreciate that the drivetrain described and illustrated merely represents the best mode of implementing the invention known to the Applicant; however, it should be understood that other mechanisms or configurations, using similar or different components, can be used to implement the present invention. Therefore, the embodiments of the invention described above are only intended to be exemplary. The scope of the invention is limited solely by the claims.

We claim:

1. An all-terrain vehicle comprising:
   a frame;
   a straddle seat mounted on the frame for supporting a driver;
   at least four wheels suspended from the frame, the at least four wheels including a front pair of wheels defining a front wheel axis and a rear pair of wheels defining a rear wheel axis, each wheel being disposed with a low-pressure balloon tire; and
   an engine mounted to the frame, the engine comprising:
       at least one cylinder unit, the at least one cylinder unit including a cylinder and a cylinder head, the cylinder having a cylinder bore and a cylinder bore axis; and
       a piston, the piston being disposed in the cylinder bore in order to reciprocate along the cylinder bore axis, the cylinder being slanted such that the cylinder bore axis is inclined with reference to a vertical axis,
   the engine powering a crankshaft in driving engagement with a transmission, the crankshaft being supported in the engine casing to rotate about a crankshaft axis,
   the transmission being in driving engagement with a subtransmission, the subtransmission being contained within a subtransmission casing, the subtransmission having an input shaft operatively connected to the crankshaft, the input shaft being supported in the subtransmission to rotate about a subtransmission shaft axis, the subtransmission shaft axis and the crankshaft axis defining a first reference plane, a first reference angle defined between the cylinder bore axis and the first reference plane being between 85° and 5°, the subtransmission including reduction gearing for driving a rear drive shaft operatively connected to a rear differential for delivering torque to the rear wheels, wherein the subtransmission casing is detachably mounted to the engine casing and secured thereto by at least one threaded fastener.

2. The all-terrain vehicle as claimed in claim 1 further comprising a front-to-rear drive shaft coupling for rotationally coupling the rear drive shaft to a front drive shaft whereby torque is delivered to both the rear differential and a front differential for providing power to both the rear wheels and front wheels.

3. The all-terrain vehicle as claimed in claim 1 wherein the transmission comprises a drive pulley driven by the crankshaft, the drive pulley being connected by a belt to a driven pulley, the driven pulley driving the subtransmission, the transmission being a continuously variable transmission (CVT) between the engine crankshaft and the subtransmission.

4. The all-terrain vehicle as claimed in claim 1 wherein the subtransmission is mounted to a rearward portion of the engine casing.

5. The all-terrain vehicle as claimed in claim 2 wherein the subtransmission comprises a 2WD-4WD selector mechanism to selectively engage or disengage the front-to-rear drive shaft coupling to switch between two-wheel-drive and four-wheel-drive.

6. The all-terrain vehicle as claimed in claim 1 wherein the subtransmission comprises a transmission selector mechanism to enable a driver to select one of a plurality of drive modes for the vehicle, the drive modes including reverse and drive.

7. The all-terrain vehicle as claimed in claim 6 wherein the drive modes further include park and neutral.

8. The all-terrain vehicle as claimed in claim 6 wherein the drive modes further include high-speed drive and low-speed drive.

9. The all-terrain vehicle as claimed in claim 1 wherein the subtransmission further comprises a mounting flange disposed on the engine casing for engaging the subtransmission, the mounting flange having a plurality of holes through which threaded fasteners may be inserted to fasten the subtransmission to the engine casing.

10. The all-terrain vehicle as claimed in claim 1, wherein the subtransmission is at least partly disposed, in a vertical plane, below the at least one cylinder unit.

11. The all-terrain vehicle as claimed on claim 1, wherein the engine casing further comprises a mounting flange, the subtransmission being mounted on the engine casing via the mounting flange, wherein, in a vertical plane, the mounting flange is at least partly disposed below the at least one cylinder unit.

12. An all-terrain vehicle comprising:
    a frame;
    a straddle seat mounted on the frame for supporting a driver;
    at least four wheels suspended from the frame, the at least four wheels including a front pair of wheels defining a front wheel axis and a rear pair of wheels defining a rear wheel axis, each wheel being disposed with a low-pressure balloon tire; and
    an engine mounted to the frame, the engine comprising:
        a first cylinder unit, the first cylinder unit including a first cylinder and a first cylinder head, the first cylinder having a first cylinder bore and a first cylinder bore axis;
        a first piston, the first piston being disposed in the first cylinder bore in order to reciprocate along the first cylinder bore axis;
        the first cylinder being slanted such that the first cylinder bore axis is inclined with reference to a vertical axis; and
        a second cylinder unit, the second cylinder unit including a second cylinder and a second cylinder head, the second cylinder having a second cylinder bore with a second cylinder bore axis, wherein the first and the second cylinder unit are arranged in a V-type cylinder configuration, the first and the second cylinder bore axis defining an opening angle, the opening angle being between 29° and 121°,
    the engine powering a crankshaft in driving engagement with a transmission, the transmission being in driving engagement with a subtransmission, the subtransmission being contained within a subtransmission casing, the subtransmission including reduction gearing for driving a rear drive shaft operatively connected to a rear differential for delivering torque to the rear wheels, wherein the subtransmission casing is detachably mounted to the engine casing and secured thereto by at least one threaded fastener.

13. The all-terrain vehicle as claimed in claim 12 further comprising a front-to-rear drive shaft coupling for rotationally coupling the rear drive shaft to a front drive shaft whereby torque is delivered to both the rear differential and a front differential for providing power to both the rear wheels and front wheels.

14. The all-terrain vehicle as claimed in claim 12 wherein the transmission comprises a drive pulley driven by the crankshaft, the drive pulley being connected by a belt to a driven pulley, the driven pulley driving the subtransmission, the transmission being a continuously variable transmission (CVT) between the engine crankshaft and the subtransmission.

15. The all-terrain vehicle as claimed in claim 12 wherein the subtransmission is mounted to a rearward portion of the engine casing.

16. The all-terrain vehicle as claimed in claim 13 wherein the subtransmission comprises a 2WD-4WD selector mechanism to selectively engage or disengage the front-to-rear drive shaft coupling to switch between two-wheel-drive and four-wheel-drive.

17. The all-terrain vehicle as claimed in claim 12 wherein the subtransmission comprises a transmission selector mechanism to enable a driver to select one of a plurality of drive modes for the vehicle, the drive modes including reverse and drive.

18. The all-terrain vehicle as claimed in claim 17 wherein the drive modes further include park and neutral.

19. The all-terrain vehicle as claimed in claim 17 wherein the drive modes further include high-speed drive and low-speed drive.

20. The all-terrain vehicle as claimed in claim 12 wherein the subtransmission further comprises a mounting flange disposed on the engine casing for engaging the subtransmission, the mounting flange having a plurality of holes through which threaded fasteners may be inserted to fasten the subtransmission to the engine casing.

21. The all-terrain vehicle as claimed in claim 12, wherein the subtransmission is at least partly disposed, in a vertical plane, below the first cylinder unit.

22. The all-terrain vehicle as claimed on claim 12, wherein the engine casing further comprises a mounting flange, the subtransmission being mounted on the engine casing via the mounting flange, wherein, in a vertical plane, the mounting flange is at least partly disposed below the first cylinder unit.

* * * * *